United States Patent Office  2,920,971
Patented Jan. 12, 1960

2,920,971

METHOD OF MAKING CERAMICS AND PRODUCT THEREOF

Stanley D. Stookey, Corning, N.Y., assignor to Corning Glass Works, Corning, N.Y., a corporation of New York No Drawing. Application June 4, 1956
Serial No. 588,994

21 Claims. (Cl. 106—39)

This invention relates to the production of ceramics by the devitrification or crystallization of glass and is particularly concerned with a novel method of promoting and controlling the crystallization of glasses, and especially of preformed glass articles, whereby to convert them to predominantly crystalline or semicrystalline ceramic bodies having useful dielectric properties, high mechanical strengths, and other desirable properties making them suitable for many purposes, both new and old.

It has been established that the crystallization which sometimes occurs or is brought about in glass compositions containing the constituents of a crystallizable compound involves the initial formation of centers of crystal growth, or nuclei, in the glass or at the surfaces of the glass when it is cooled or is reheated after having been cooled, upon which crystals of the compound can form and grow.

Accidental or uncontrolled crystallization sometimes occurs during the working of a glass having too high a liquidus, whereby relatively coarse crystals of various sizes are formed. Such crystallization is undesirable and serves no useful purpose. On the contrary, it may seriously diminish the transparency and mechanical strength of the glass.

Intentional or controlled crystallization is commonly utilized for the production of light-diffusing glasses, such as the so-called opal and alabaster glasses. It is accomplished by providing a glass batch with a small proportion of the ingredients of a compound which is soluble in the glass but crystallizable therefrom, such as an alkali metal fluoride, the proportions being sufficient to cause the formation of invisible nuclei of the compound when the glass is cooled and/or thereafter reheated. The growth of such nuclei to form light-diffusing crystals may occur either during cooling (spontaneous opals) or when the glass is subsequently reheated.

Such crystallization is initiated by homogeneous nucleation, that is, by the preliminary formation of nuclei of the same composition as the crystals. Less than 5% or, at the most, 10% of the total composition can thereby be crystallized, relatively few compositions are adaptable for such purpose, and the products remain glasses.

Some special photosensitive glass compositions, containing a photosensitive metal consisting of gold, silver, or copper are known from my prior Patents 2,515,940 and 2,515,941, in which a small proportion of light-diffusing crystals of lithium- or barium-disilicates can be heterogeneously nucleated by exposure of the glass to short wave radiations to initiate the formation of nuclei of the photosensitive metal followed by heat treatment of the glass to precipitate or grow the crystals on the initially formed nuclei of the photosensitive metal.

In my co-pending application Serial No. 538,510, filed October 4, 1955 of which my present application is a continuation in part, and which is in turn a continuation in part of my application Serial No. 340,652, filed March 5, 1953, now abandoned, I have disclosed a method of nucleating, and substantially completely crystallizing by special high temperature heat treatment certain thermally opacifiable glasses including a photothermally opacifiable glass consisting essentially of 70–85% $SiO_2$, 2–19% $Al_2O_3$, and 5.5–15% $Li_2O$, the ratio $Al_2O_3/Li_2O$ being less than 1.7/1, and containing as the nucleating agent a colloidal metal. Among the embodiments disclosed in that application are compositions and methods using the photosensitive metals, gold, silver, or copper.

In all cases where the noble metals and photosensitive metals are employed, precipitation of the crystallizable compounds depends upon the presence of the metals in the colloidal state to serve as nuclei; and the methods are applicable to only the very limited range of compositions capable of forming crystals which will form and grow on such nuclei. Additionally, the photographic methods include the preliminary exposure of the glass to short wave radiations, such as ultraviolet radiations, and are limited to photosensitive glass compositions.

Semi-crystalline ceramic bodies such as those known as porcelain, bisque, china, refractory bodies, and the like, have also been made by mixing and shaping finely divided particles of compositions comprising crystalline compounds such as corundum, mullite, quartz and the like, or mixtures of argillaceous and siliceous materials, which will interact to produce these and other compounds, and heating the shaped bodies to cause interaction and sintering of the constituents. Such method is relatively slow and comprises many steps including drying and firing which consume much time. In order to avoid excessive shrinkage and the formation of cracks in relatively massive bodies made by such method during drying and firing, it is often necessary to include in the batch relatively coarse material or grog, which further increases the normal inhomogeneity of the product. Such heterogeneous products contain voids resulting from interstices between the particles of the batch.

In Armistead Patent No. 2,691,855, there are disclosed glasses suitable for making the opaque backs of thermometer tubes and comprising primarily $SiO_2$, $Al_2O_3$, and MgO or CaO or both, and containing a substantial amount of $TiO_2$ as an opacifying agent. Since Armistead's purpose is to provide an opaque glass capable of being worked and drawn, the proportion of crystalline material which may be tolerated in his product is necessarily very small; so that his final product is predominantly glass, opacified by $TiO_2$.

I have now discovered that controlled heat treatment of a large variety of compositions containing $TiO_2$, within temperature and time ranges hereinafter more fully described, results in the formation and growth of a crystalline phase or phases other than $TiO_2$, whereby the glass is converted to a predominantly crystalline ceramic having a deformation temperature above that of the parent glass and a substantially infinite viscosity below its deformation temperature. I have further found that articles made of such glasses can be converted by the hereinafter described heat treatment to a substantially crystalline product comprising a multiplicity of very small interlocked crystals of the aforesaid crystalline phase or phases, 0.1–20 microns in diameter, in most cases amounting to all or nearly all of the composition. This is contingent, as I have discovered, on the considerations that such glasses contain a substantial amount, 2–20%, of $TiO_2$ and a major proportion of constituents soluble in the glass but capable of forming one or more crystalline compounds under conditions of thermodynamic equilibrium. Such crystallizable compounds are shown by way of example in Table XV.

According to the invention the new method comprises compounding and melting a batch for a glass containing as nucleating agent 2–20 weight percent of $TiO_2$ and the constituents of inorganic compounds other than $TiO_2$ at least one of which compounds is crystallizable therefrom by said nucleating agent, the proportion of such crystallizable compounds totalling to at least 50 weight percent of the composition, exclusive of $TiO_2$, cooling the glass below the maximum nucleation temperature of the nucleating agent but above the annealing point of the glass for a time sufficient to form nuclei thereof in the glass, and reheating it to crystallize on said nuclei a major proportion of said crystallizable compounds at a temperature above said annealing point but below the temperature at which the predominant crystalline phase will redissolve, until the viscosity of the resulting mixture in such temperature range is substantially infinite.

For the purpose of clarification:

The maximum nucleation temperature, as used herein, is the temperature to which or below which the glass must be cooled in order to initiate the formation of visible crystals other than $TiO_2$ at a substantial rate when the glass is thereafter reheated;

A major proportion means more than 50 weight percent;

The annealing point is the temperature at which the viscosity of the glass is $10^{13}$ poises. (The annealing point may be determined by the method set forth in the publication entitled "Re-evaluation of Glass Viscosities at Annealing and Strain Points," by H. R. Lillie, Jour. Amer. Cer. Soc., volume 37, pages 111–117 (1954).)

A predominant crystalline phase is one the dissolution of which results in a substantial and permanent deformation of the article and, Infinite viscosity means a viscosity so high that the product exhibits the elastic and mechanical properties customarily attributed to a solid rather than a liquid. It is to be understood that the degree of plasticity of the crystallized product at high temperatures depends upon he amount of residual glass therein; and that a disproportionate crystallization of the constituents of the parent glass will change the composition of the residual glass and may raise the softening or deformation temperature of the residual glass.

The process may be utilized for treating preformed glass articles of any desired shape to convert them to crystalline articles without change of size and shape. Glass fibers so treated are converted to high-melting ceramic fibers which may be utilized for high temperature insulation. The glass may also be pulverized and mixed with a finely divided ceramic material of greater refractoriness than the glass, such as clay, alumina, zircon, thoria, and the like and the mixture may be molded into shape and heated to fuse the glass. The finely divided glass in the mixture will, of course, crystallize before it fuses because the necessary nuclei were formed in the glass when it was cooled. To enable the glass to wet and bond the more refractory material, therefore, it is necessary to raise the temperature above the liquidus to redissolve the crystals, after which the shaped article is cooled and again reheated according to the new process.

As a nucleating agent $TiO_2$ is particularly effective and its effectiveness for the purpose of the invention is believed to be primarily due to its tendency to form submicroscopic nuclei in the glass when the viscosity thereof is too high to permit self-crystallization and that such nuclei, therefore, can increase only in number but not substantially in size before the glass is reheated. The presence of such nuclei and the maximum temperature at which they form may be determined by microscopic observation of the growth thereon of a crystalline phase other than $TiO_2$ when the glass is reheated. Such determination may be accomplished by means of a conventional micro-furnace adapted to melt a droplet of glass while it is under microscopic observation, the temperature of the droplet being capable of close and rapid control and accurate measurement.

For such determination, the droplet, after being completely melted, is cooled to an arbitrarily selected temperature, held for a minute, and then reheated to a temperature near enough to the lowest liquidus to insure that crystallization will occur if $TiO_2$ nuclei have formed. If no crystals are to be seen, the sample is cooled to a somewhat lower temperature than before and is again reheated to observe crystal formation, if any. Such procedure is continued until the maximum nucleation temperature is found.

Nucleation, or the formation of nuclei, occurs when the glass is cooled through a range of temperatures extending from its maximum nucleation temperature down to about its annealing point. By the time the glass has cooled to its annealing point its viscosity has become so high as to make nucleation at this temperature very slow. Below the annealing point, therefore, nucleation is impracticable. Nucleation is quite rapid at or just below the maximum nucleation temperature where it may be adequately completed in about one minute, but over 100 hours may be required at the annealing point.

If the article is insufficiently cooled for adequate nucleation, the crystals may be too few, too large and too variable in size to provide an article of optimum strength, since more numerous and, hence, uniformly finer crystals tend to increase the mechanical strength of the article. The number of nuclei formed by cooling the glass article merely to the maximum nucleation temperature and immediately reheating it is usually insufficient for the present purpose.

To insure the desired nucleation and crystallization, it is preferable to cool the article substantially below, and in some instances as much as 100°–300° C. below, the maximum nucleation temperature before reheating it. The optimum temperature for nucleation is, in general, about 50° C. above the annealing point of the glass; and the optimum time of holding the glass article at this temperature before reheating it to cause crystallization will usually, or in many cases, be about 0.5 to 2 hours; however, continuing to hold at this temperature after nucleation is completed is not detrimental.

When the glass contains a plurality of dissolved crystallizable compounds, it possesses more than a single liquidus and the lowest temperature at which a predominant crystalline phase will redissolve represents the deformation temperature of the final product, that is, the lowest temperature at which the final product will substantially and permanently deform.

A relatively rapid and practical method for the approximate determination of each liquidus comprises heating a previously cooled and nucleated bar or rod of the glass for several hours in a gradient furnace in which the various temperatures throughout the length of the furnace are known. After such treatment the cooler portion of the glass bar or rod, which was heated between the nucleation temperature and the highest liquidus, will be crystallized while the portion, which was heated above the highest liquidus, will be clear. The zones in which the various crystalline phases occur can be identified by microscopic examination or X-ray diffraction pattern and the corresponding temperatures are determined by the position of such zones in the gradient furnace.

The highest liquidus may be determined more simply in the microfurnace by cooling a droplet of the glass sufficiently to insure the formation of nuclei, reheating it to cause crystallization, and further heating it to the temperature at which all of the crystals are redissolved.

The crystallization of the glass during the reheating step proceeds more and more rapidly as the temperature is increased toward the liquidus of a predominant crystalline phase. In the early stages of crystallization, however, while the proportion of glass matrix is relatively large, the article is deformable if its temperature is increased too rapidly. The rate of increase of temperature, therefore, should be slow enough to avoid substantial deformation, say not to exceed about 5° C. per minute. Obviously, carrying the temperature above the liquidus of a predominant crystalline phase would result in dissolution of such phase. If the compound being crystallized has an inversion point involving a change in its density and/or thermal expansion coefficient, as is sometimes the case, the expected breakage of the article due to such change in passing through the inversion point is not ordinarily encountered. This unexpected advantage of the new method is believed to depend upon the extreme fineness of the crystals which is characteristic of the new products and which nullifies such an effect.

The optimum heating rate and/or holding temperature may vary with different compositions and may be estimated for a given composition by observation of the deformation of a bar thereof, having a cross section of about ¼ x ¼ inch and supported on spaced knife edges, say about 4 inches apart, while its temperature is being raised at an arbitrary rate or held at an arbitrary value. The amount of deformation or sag at the center of the bar between the supports may be measured with a micrometer telescope. As a rough indication of the suitability of a specific rate of heat-treatment for articles of intricate shape which cannot be suitably supported during heat-treatment, the sag in a 4 inch span should not exceed ½ inch. For articles which can be supported, such as plates, cup-shaped hollow articles and the like, the permissible sag by this test may amount to 1 inch or even more.

I have found that the number of crystallizable compounds, the components of which can be formed into glasses, and which can subsequently be crystallized from such glasses containing 2 to 20 weight percent $TiO_2$ according to the invention is surprisingly large. Molten mixtures containing major proportions of the constituents of one or more of such crystallizable compounds and, if desired, a small amount of $Na_2O$ or $K_2O$ and/or miscellaneous compatible oxides, such as for example $B_2O_3$ and $ZrO_2$, to promote melting, can be cooled to form glasses in which such crystallizable compounds may subsequently be crystallized by the new method.

I have further found that a large number of such glass compositions amenable to the invention may be defined and classified as consisting essentially of the four components, $SiO_2$, $Al_2O_3$, $TiO_2$, and one or more of the basic metal oxides, $Li_2O$, BeO, MgO, CaO, ZnO, SrO, CdO, BaO, PbO, MnO, FeO, CoO, and NiO, said four components totalling at least 90 and, preferably 95, weight percent of the composition of which the $TiO_2$ is 2 to 20%. The term "basic metal oxides" as used herein refers to glass-network modifiers which are capable of combining with $SiO_2$ and other network formers to form silicate and other glasses and includes some which are not strongly alkaline in character.

In order that the final crystalline product may contain a desirably low proportion of, or substantially no, glassy matrix and may possess substantially the properties of the crystalline compounds formed therein, the total amount of $Na_2O$, $K_2O$ and other miscellaneous compatible metal oxides, if present, should not exceed 10 weight percent, the $Na_2O$ and/or $K_2O$ preferably being not over 5 weight percent.

The broadest useful range of the proportions of $TiO_2$ in the glass is approximately 2 to 20 weight percent but the optimum amount varies with the initial glass composition, being generally larger as the $SiO_2$ content of the glass is lower and/or if $Na_2O$ or $K_2O$ is present. Less than 2% $TiO_2$ is generally ineffective but more than 20% dilutes the final product with crystalline $TiO_2$ at the expense of more desirable crystalline compounds, or it may cause spontaneous crystallization when the glass is cooled from the molten state which is undesirable and defeats the objects of the invention. For a specific glass composition an increase in the proportion of $TiO_2$ within the above stated range increases the number of nuclei which will be formed and causes the crystallization of the crystallizable compound in the glass to occur more readily and usually at a somewhat lower temperature than it otherwise would. As a result of such controllability, the rate of crystallization of the glass is sufficiently rapid to prevent substantial deformation of the article if its temperature is increased by not more than 5° C. per minute after crystallization has set in.

During crystallization, the temperature at which substantial deformation of the article can occur increases progressively, and the deformation temperature of the final crystalline product may reach a maximum of 1300° C. or more. Below the deformation temperature the viscosity of the final product is substantially infinite.

Substantial changes in the density and thermal expansion coefficient of a glass treated by the new method also usually occur during the crystallization thereof and it is characteristic of the new method that such changes cease when the latent crystallizability of the glass is exhausted and the density and thermal expansion coefficient thereupon become substantially constant.

In carrying out the invention anyone skilled in glass technology and particularly in the art of compounding and melting glass can, without prior experimentation, prepare a composition containing the constituents of one or more desirable normally crystalline compounds, which can be made the major proportion of a glass and which, by inclusion of 2 to 20 weight percent $TiO_2$ as a nucleating agent, can be crystallized from the glass to form a crystalline ceramic by heat treatment in accordance with the new method.

Such crystalline compounds are enumerated in publications showing and describing the phase diagrams of ternary systems of ceramic compositions and particularly compositions containing $SiO_2$, $Al_2O_3$, and one or more of the basic metal oxides $Li_2O$, BeO, MgO, CaO, ZnO, SrO, CdO, BaO, PbO, MnO, FeO, CoO, and NiO. A particularly useful publication is the book entitled "Phase Diagrams for Ceramists," by Levin, McMurdie, and Hall, published by the American Ceramic Society, 1956 edition. Such diagrams show various ternary and quaternary compositions in which crystalline and liquid phases are in thermodynamic equilibrium, and recite the melting points and eutectics of the various crystalline phases. The physical properties of most crystalline compounds, such as density, thermal expansion coefficient, and electrical properties, are known and can be ascertained by reference to mineralogical tables for the purpose of selecting crystalline compounds having desirable properties.

One or more desirable crystalline compounds, such as those shown by way of example in Table XV, having been selected, a batch which can be melted is compounded of glass-making materials comprising, on the oxide basis, 2 to 20, and preferably 8 to 15, weight percent $TiO_2$ and the components of such compound, or compounds in proportions, exclusive of $TiO_2$, which are equivalent to more than 50 weight percent of the composition. Such batch is then melted and fabricated and the glass is thereafter cooled and reheated in the manner set forth above to cause crystallization thereof.

For example, the phase diagrams shown in Fig. 379 on page 142, and Fig. 381 on page 143 of the above-mentioned book by Levin et al. represent the ternary system $MgO \cdot Al_2O_3 \cdot SiO_2$. In one region of the diagrams the crystalline phase is cordierite ($2MgO \cdot 2Al_2O_3 \cdot 5SiO_2$). The weight percentage composition of cordierite is 51.4% $SiO_2$, 34.9% $Al_2O_3$, 13.7% MgO and its expansion coefficient is about $14 \times 10^{-7}$ per °C.

As a more specific example of the production of compositions in which cordierite is the predominant crystalline phase in accordance with the invention the following procedures are given:

Batches for compositions 12 and 15 of Table III were individually melted in a small tank furnace of the type known as a day tank and the resulting glasses were worked by pressing and drawing in the conventional manner to form 6½ inch square plates with a thickness of ¼ inch, and cane, respectively. The glass of composition 12 had an expansion coefficient of $37.5 \times 10^{-7}$/°C. and a density of 2.74 g./cc.; and the glass of composition 15 had an expansion coefficient of $37.7 \times 10^{-7}$/°C. and a density of 2.62 g./cc. Appropriate samples of each glass were subjected to the following heat treatments.

Samples of the glass of composition 12 were nucleated by heating them in an electrically heated muffle the temperature of which was uniformly increased at the rate of 300° C. per hour from room temperature to 870° C. where they were held for ½ hour. The temperature of the muffle was then uniformly raised at 300° C. per hour to 1345° C. where it was held for one hour. After being cooled the expansion coefficient of the product was $14.1 \times 10^{-7}$/°C., the density was 2.62 g./cc., the deformation temperature was 1370° C., and the transverse flexural strength was 37,500 p.s.i.

Samples of the glass of composition 15 were nucleated by heating them in the electric muffle raised uniformly at 300° C. per hour from room temperature to 820° C. where they were held for two hours. The temperature of the muffle was then uniformly raised at 200° C. per hour to 1250° C. where it was held for one hour. After being cooled the expansion coefficient of the product was $56 \times 10^{-7}$/°C., the density was 2.59 g./cc., the deformation temperature was 1275° C., and the transverse flexural strength was 31,200 p.s.i.

In comparison with the composition of pure cordierite, the compositions of Examples 12 and 15 of Table III, recalculated in weight percent without $TiO_2$, are as follows:

*Table I*

|  | Cordierite | 12 | 15 |
| --- | --- | --- | --- |
| $SiO_2$ | 51.4 | 51.4 | 61.7 |
| $Al_2O_3$ | 34.9 | 34.5 | 21.8 |
| MgO | 13.7 | 14.1 | 16.5 |

From Table I it will be seen that the composition of Example 12, exclusive of $TiO_2$, corresponds to substantially 100% cordierite. By reference to Table XV it will be seen that the final product of the given heat treatment of Example 12 contains only two crystalline phases, cordierite and rutile, and that cordierite is the predominant crystalline phase.

The composition of Example 15, exclusive of $TiO_2$, contains $SiO_2$ and MgO proportionately in excess of the cordierite ratio based on the amount of $Al_2O_3$ which it contains. Calculation shows that the maximum amounts of $SiO_2$, $Al_2O_3$, and MgO in the proportions corresponding to cordierite in the composition of Example 15 comprise 62.5% of the composition. By reference to Table XV it will be seen that the final product of the given heat treatment of Example 15 contains four crystalline phases, cordierite, magnesium titanate, rutile, and cristobalite, of which cordierite forms the predominant crystalline phase.

It is believed, however, that the separation of a crystalline phase during the heat treatment of the glass according to the invention does not necessarily proceed to completion but may reach an equilibrium which is governed by the amount of $TiO_2$, which is present, the extent of nucleation, and the presence of $Na_2O$ and/or $K_2O$, if any. Large amounts of $TiO_2$ within the stated limits, complete nucleation, and absence of $Na_2O$ and $K_2O$ are believed to be conducive of complete crystallization. Thus, while compositions 12 and 15, referred to above, are seen to have the components of cordierite in the proportions of nearly 100% and 62.5% respectively, it will be appreciated that the proportion of cordierite actually present in the final product may be somewhat less.

The following examples of glass compositions, computed in weight percent on the oxide basis from their respective batches, illustrate the broad scope of the new method. It applies generally to all compositions which can be melted to form glasses and from which compounds can be crystallized by heterogeneous nucleation with $TiO_2$ and subsequent heat treatment. Such examples represent glasses falling within the useful range of compositions which are subject to treatment in accordance with the invention. On account of the tedious and protracted procedures involved in the determination of their physical properties, some of the properties were not measured; but where the physical properties of the glasses and their crystalline products have been measured, those properties are given. Even in those cases where the properties are not given, however, the examples represent actual compositions which were compounded, melted to glasses, and treated in accordance with the teachings herein set forth; and the resulting products had the characteristics of the desired ceramics.

In the following examples the actual values for "Exp. Coeff." and "Strength," which comprise from 4 to 8 digits, have been multiplied, as indicated by $10^7$ and $10^{-3}$ respectively to conserve space in the tables. Such values, where given in the tables, are to be multiplied by $10^{-7}$ and $10^3$ respectively to obtain the actual corresponding values.

*Table II*

|  | 1 | 2 | 3 | 4 | 5 | 6 | 7 | 8 |
| --- | --- | --- | --- | --- | --- | --- | --- | --- |
| $SiO_2$ | 69.8 | 57.6 | 61.7 | 73.1 | 58.7 | 56.1 | 67.4 | 63.7 |
| $Al_2O_3$ | 14.9 | 15.2 | 15.3 | 13.5 | 13.7 | 12.1 | 14.4 | 12.1 |
| $TiO_2$ | 7.0 | 12.1 | 10.7 | 4.5 | 13.7 | 13.8 | 7.0 | 13.8 |
| $Li_2O$ | 4.3 | 5.2 | 4.3 | 4.9 | 3.9 | 3.0 | 4.2 | 3.1 |
| MgO |  |  |  |  | 8.8 | 3.9 | 1.2 | 3.9 |
| CaO |  |  |  |  |  | 11.1 | 1.8 | 3.4 |
| $CaF_2$ |  |  |  | 2.1 |  |  |  |  |
| $Na_2O$ | 1.0 | 1.6 | 0.9 | 1.7 | 1.0 |  | 1.0 |  |
| $K_2O$ |  |  | 0.1 | 0.2 | 0.2 |  |  |  |
| $B_2O_3$ | 3.0 | 4.7 | 3.1 |  |  |  | 3.0 |  |
| $ZrO_2$ |  | 3.6 | 3.9 |  |  |  |  |  |
| Glass: |  |  |  |  |  |  |  |  |
| Exp. Coeff./°C. $\times 10^7$ |  | 47.9 | 53.5 |  |  |  |  |  |
| Density, g./cc |  | 2.52 | 2.48 |  |  |  |  |  |
| Cryst'n. temp., °C | 950 |  | 900 |  | 950 | 950 | 950 | 900 |
| Hrs. @ cryst'n. temp | 2 |  | 2 |  | 0.5 | 0.5 | 2 | 1 |
| Properties of Ceramic Products: |  |  |  |  |  |  |  |  |
| Exp. Coeff./°C. $\times 10^7$ | 11.4 | 22.0 | 17.2 |  |  |  |  | 64.4 |
| Density, g./cc |  | 2.57 | 2.55 |  |  |  |  |  |
| Strength, p.s.i. $\times 10^{-3}$ | 16.3 |  |  |  |  |  |  | 17.8 |

Table III

|  | 9 | 10 | 11 | 12 | 13 | 14 | 15 | 16 |
|---|---|---|---|---|---|---|---|---|
| $SiO_2$ | 64.8 | 42.8 | 45.8 | 45.5 | 50.2 | 52.5 | 56.0 | 57.8 |
| $Al_2O_3$ | 18.5 | 30.2 | 25.3 | 30.5 | 26.5 | 26.5 | 20.0 | 8.9 |
| $TiO_2$ | 7.4 | 13.0 | 11.1 | 11.5 | 11.4 | 9.1 | 9.0 | 11.1 |
| BeO | 9.3 | | | | | | | |
| MgO | | 14.0 | 17.8 | 12.5 | 11.9 | 11.9 | 15.0 | 22.2 |
| Glass: | | | | | | | | |
| Cryst'n. temp., °C | 1,250 | 1,200 | 1,300 | 1,345 | 1,250 | 1,300 | 1,250 | 1,300 |
| Hrs. @ cryst'n. temp | 1.5 | 16 | 16 | 1 | 2 | 16 | 1 | 16 |
| Properties of Ceramic Products: | | | | | | | | |
| Exp. Coeff./°C.×$10^7$ | | 16.5 | 22.6 | 14.1 | 21.5 | 28.3 | 56.0 | 39.9 |
| Density, g./cc | | 2.65 | 2.68 | 2.62 | 2.60 | | 2.59 | |
| Def. temp., °C | | | | 1,370 | 1,300 | | 1,275 | |
| Strength, p.s.i.×$10^{-3}$ | | 24 | 17.3 | 37.5 | 30 | 23 | 31.2 | |

Table IV

|  | 17 | 18 | 19 | 20 | 21 | 22 | 23 | 24 |
|---|---|---|---|---|---|---|---|---|
| $SiO_2$ | 46.7 | 58.1 | 60.4 | 64.2 | 67.5 | 53.3 | 48.9 | 45.2 |
| $Al_2O_3$ | 28.9 | 19.1 | 21.4 | 13.8 | 12.5 | 26.7 | 26.7 | 29.5 |
| $TiO_2$ | 10.2 | 9.1 | 9.1 | 8.2 | 11.1 | 11.1 | 11.1 | 10.8 |
| MgO | 13.3 | 13.7 | 9.1 | 13.8 | 8.9 | 3.6 | 5.3 | 10.4 |
| $Li_2O$ | 0.9 | | | | | | | |
| CaO | | | | | | 5.3 | 8.0 | |
| $K_2O$ | | | | | | | | 1.8 |
| F | | | | | | | | 2.3 |
| Glass: | | | | | | | | |
| Cryst'n. temp., °C | 1,300 | 1,300 | 1,200 | 1,200 | | 1,250 | 1,250 | 1,100 |
| Hrs. @ cryst'n. temp | 16 | 16 | 1 | 16 | | 3 | 3 | 6 |
| Properties of Ceramic Products: | | | | | | | | |
| Exp. Coeff./°C.×$10^7$ | 17.7 | 63.3 | 52.9 | | | 33.8 | 29.6 | |
| Density, g./cc | | 2.56 | | 2.55 | 2.49 | 2.65 | 2.67 | |
| Strength, p.s.i.×$10^{-3}$ | 20 | 33.5 | 27 | | | 25 | 19.3 | |

Table V

|  | 25 | 26 | 27 | 28 | 29 | 30 | 31 | 32 |
|---|---|---|---|---|---|---|---|---|
| $SiO_2$ | 44.5 | 50.4 | 54.6 | 48.9 | 53.4 | 53.4 | 57.8 | 62.3 |
| $Al_2O_3$ | 31.1 | 26.9 | 19.1 | 24.9 | 22.2 | 17.7 | 16.0 | 13.3 |
| $TiO_2$ | 11.1 | 13.0 | 9.1 | 11.1 | 11.1 | 11.1 | 11.1 | 11.1 |
| MgO | 5.3 | 3.6 | 10.9 | | | | | |
| CaO | 8.0 | 6.1 | | 15.1 | 13.3 | 17.8 | 15.1 | 13.3 |
| BaO | | | 4.5 | | | | | |
| $ZrO_2$ | | | 1.8 | | | | | |
| Glass: | | | | | | | | |
| Cryst'n. temp., °C | 1,250 | 1,200 | 1,200 | 1,200 | 1,275 | 1,200 | 1,100 | 1,100 |
| Hrs. @ cryst'n. temp | 3 | 2.5 | 6 | 1 | 16 | 1 | 16 | 16 |
| Properties of Ceramic Products: | | | | | | | | |
| Exp. Coeff./°C.×$10^7$ | | 41.7 | 29.1 | | | | | |
| Density g./cc | 2.74 | | | 2.75 | | 2.71 | 2.80 | 2.71 |
| Strength, p.s.i.×$10^{-3}$ | 11.2 | 17.2 | 16.3 | | | | | |

Table VI

|  | 33 | 34 | 35 | 36 | 37 | 38 | 39 | 40 |
|---|---|---|---|---|---|---|---|---|
| $SiO_2$ | 66.7 | 71.1 | 53.4 | 43.5 | 43.5 | 44.6 | 43.5 | 43.5 |
| $Al_2O_3$ | 15.5 | 12.5 | 26.7 | 17.4 | 17.4 | 17.9 | 17.4 | 17.4 |
| $TiO_2$ | 11.1 | 11.1 | 11.1 | 8.7 | 8.7 | 10.7 | 8.7 | 8.7 |
| CaO | 6.7 | 5.3 | 8.9 | 4.3 | | | | |
| ZnO | | | | 26.1 | 26.1 | 17.9 | 26.1 | 26.1 |
| MgO | | | | | | 4.3 | | |
| BaO | | | | | | 8.9 | | |
| PbO | | | | | | | 4.3 | |
| Glass: | | | | | | | | 4.3 |
| Exp. Coeff./°C.×$10^7$ | | | | 38.3 | 36.7 | | 31.7 | |
| Cryst'n. temp., °C | 1,300 | 1,300 | 1,200 | | 1,200 | 1,145 | 1,250 | 1,200 |
| Hrs. @ cryst'n. temp | 16 | 16 | 16 | | 1 | 2 | 1 | 1 |
| Properties of Ceramic Products: | | | | | | | | |
| Exp. Coeff./°C.×$10^7$ | | | 84.7 | | 172 | 179 | | 172 |
| Density, g./cc | 2.48 | | 2.68 | | | | | |
| Def. temp., °C | | | | 1,100 | 1,125 | | 1,025 | 875 |
| Strength, p.s.i.×$10^{-3}$ | | | 17.4 | | 21.5 | 80 | | 11.9 |

Table VII

|  | 41 | 42 | 43 | 44 | 45 | 46 | 47 | 48 |
|---|---|---|---|---|---|---|---|---|
| $SiO_2$ | 48.5 | 50.9 | 58.2 | 49.0 | 46.3 | 41.7 | 60.2 | 38.5 |
| $Al_2O_3$ | 14.6 | 23.2 | 14.6 | 19.6 | 18.5 | 9.3 | 18.5 | 14.4 |
| $TiO_2$ | 2.9 | 7.4 | 2.9 | 2.0 | 7.4 | 7.4 | 7.4 | 3.8 |
| ZnO | 34.0 | 18.5 | 24.3 | 29.4 | 27.8 | 41.6 | 13.9 | 43.3 |
| Glass: | | | | | | | | |
| Exp. Coeff./°C.×$10^7$ | 32.3 | 26.7 | 25.6 | 26.9 | 29.8 | | | 35.0 |
| Density, g./cc | 3.17 | 2.92 | | 3.08 | | 3.23 | | |
| Cryst'n. temp., °C | 1,200 | 1,250 | 1,100 | 1,250 | 1,100 | 1,250 | 1,250 | |
| Hrs. @ cryst'n. temp | 2.5 | 16 | 2 | 2 | 45 | 2 | 2 | |
| Properties of Ceramic Products: | | | | | | | | |
| Exp. Coeff./°C.×$10^7$ | 193 | 193 | 189 | 183 | 165 | | | |
| Density, g./cc | 3.13 | 2.99 | | | | 3.23 | | |
| Strength, p.s.i.×$10^{-3}$ | 13.5 | | 19 | 5.5 | 15.6 | | | |

Table VIII

|  | 49 | 50 | 51 | 52 | 53 | 54 | 55 | 56 |
|---|---|---|---|---|---|---|---|---|
| $SiO_2$ | 44.3 | 44.7 | 45.9 | 36.4 | 54.6 | 27.3 | 48.5 | 47.9 |
| $Al_2O_3$ | 17.7 | 22.3 | 22.9 | 22.7 | 13.6 | 27.3 | 21.6 | 18.3 |
| $TiO_2$ | 11.5 | 10.7 | 8.3 | 9.1 | 9.1 | 9.1 | 10.1 | 11.3 |
| $SrO$ | 26.5 | | | | | | | |
| $CdO$ | | 22.3 | 22.9 | 31.8 | 22.7 | 36.3 | 15.0 | |
| $MgO$ | | | | | | | 4.8 | 4.7 |
| $BaO$ | | | | | | | | 17.8 |
| Glass: | | | | | | | | |
| Exp. Coeff./° C.×10⁷ | | 31.0 | 29.9 | | 31.6 | | 40.7 | 40.6 |
| Density, g./cc | | | 2.97 | | | | 2.87 | 2.90 |
| Cryst'n. temp, ° C | 1,150 | 1,250 | 1,100 | 1,100 | 1,100 | | 1,150 | 1,150 |
| Hrs. @ cryst'n. temp | 3 | 2 | 40 | 2 | 20 | | 2 | 2 |
| Properties of Ceramic Products: | | | | | | | | |
| Exp. Coeff./° C.×10⁷ | 75 | 102 | 91 | 42 | | | 39.7 | 38.5 |
| Density, g./cc | | | 3.11 | | | | 2.86 | 2.97 |
| Strength, p.s.i.×10⁻³ | 16 | 19 | 4.9 | 12.5 | 13 | | | |

Table IX

|  | 57 | 58 | 59 | 60 | 61 | 62 | 63 | 64 |
|---|---|---|---|---|---|---|---|---|
| $SiO_2$ | 39.5 | 43.8 | 48.2 | 43.8 | 48.2 | 52.5 | 39.5 | 43.9 |
| $Al_2O_3$ | 13.2 | 13.2 | 13.2 | 17.6 | 17.6 | 17.6 | 21.9 | 21.9 |
| $TiO_2$ | 12.3 | 12.3 | 12.3 | 12.3 | 12.3 | 12.3 | 12.3 | 12.3 |
| $BaO$ | 35.0 | 30.7 | 26.3 | 26.3 | 21.9 | 17.6 | 26.3 | 21.9 |
| Glass: | | | | | | | | |
| Exp. Coeff./° C.×10⁷ | 73.6 | 56.2 | 52.0 | 49.4 | | | 50.7 | |
| Density, g./cc | 5.56 | 3.12 | 3.02 | 3.01 | 2.95 | | 3.08 | 2.98 |
| Cryst'n. temp., ° C | 780 | 1,100 | | 1,300 | 1,300 | 1,300 | 1,250 | 1,300 |
| Hrs. @ cryst'n. temp | 2 | 20.5 | | 15 | 0.5 | 0.5 | 15 | 0.5 |
| Properties of Ceramic Products: | | | | | | | | |
| Exp. Coeff./° C.×10⁷ | 51.2 | 91.7 | | 32.8 | | | 35.7 | |
| Density, g./cc | 5.85 | 3.17 | | 3.08 | 2.99 | | 3.10 | 3.03 |
| Strength, p.s.i.×10⁻³ | | | | 8 | | | 9.3 | |

Table X

|  | 65 | 66 | 67 | 68 | 69 | 70 | 71 | 72 |
|---|---|---|---|---|---|---|---|---|
| $SiO_2$ | 46.0 | 41.7 | 46.2 | 44.7 | 26.6 | 31.1 | 35.5 | 38.4 |
| $Al_2O_3$ | 24.1 | 26.3 | 20.1 | 17.9 | 17.8 | 17.8 | 17.8 | 17.8 |
| $TiO_2$ | 12.3 | 12.3 | 12.5 | 10.6 | 11.1 | 11.1 | 11.1 | 11.1 |
| $BaO$ | 17.6 | 19.7 | 17.4 | 17.5 | | | | |
| $CaO$ | | | 3.8 | | | | | |
| $ZnO$ | | | | 9.3 | | | | |
| $PbO$ | | | | | 44.5 | 40.0 | 35.6 | 32.7 |
| Glass: | | | | | | | | |
| Exp. Coeff./° C.×10⁷ | | | 43.3 | 38.5 | 53.9 | 49.6 | 45.6 | 41.8 |
| Density, g./cc | 2.96 | 3.01 | 2.91 | 2.98 | 4.08 | 3.83 | 3.63 | 3.35 |
| Cryst'n. temp., ° C | 1,300 | 1,300 | 1,150 | 1,150 | 1,100 | 1,100 | 1,100 | 1,000 |
| Hrs. @ cryst'n. temp | 0.5 | 0.5 | 2 | 2 | 18 | 18 | 18 | 3 |
| Properties of Ceramic Products: | | | | | | | | |
| Exp. Coeff./° C.×10⁷ | | | | | 36.0 | 36.1 | 42.7 | 59.2 |
| Density, g./cc | 2.96 | 2.93 | | | 4.04 | 3.83 | 3.62 | 3.50 |
| Def. temp., ° C | | | 1,200 | 1,250 | 1,150 | 1,150 | 1,110 | 1,075 |

Table XI

|  | 73 | 74 | 75 | 76 | 77 | 78 | 79 | 80 |
|---|---|---|---|---|---|---|---|---|
| $SiO_2$ | 26.6 | 31.1 | 31.1 | 35.6 | 17.8 | 17.8 | 17.8 | 15.6 |
| $Al_2O_3$ | 15.5 | 15.5 | 13.3 | 13.3 | 13.3 | 8.9 | 4.4 | 4.4 |
| $TiO_2$ | 11.1 | 11.1 | 11.1 | 11.1 | 11.1 | 11.1 | 11.1 | 11.1 |
| $PbO$ | 46.8 | 42.3 | 44.5 | 40.0 | 57.8 | 62.2 | 66.7 | 68.9 |
| Glass: | | | | | | | | |
| Exp. Coeff./° C.×10⁷ | 53.0 | 49.1 | 48.9 | | 64.4 | 67.0 | | 76.8 |
| Density, g./cc | 4.15 | 3.90 | | | 4.80 | 5.1 | 5.51 | 5.62 |
| Cryst'n. temp., ° C | 1,100 | 1,100 | | | 750 | 750 | 750 | 780 |
| Hrs. @ cryst'n. temp | 18 | 4 | | | 17 | 17 | 2 | 2 |
| Properties of Ceramic Products: | | | | | | | | |
| Exp. Coeff./° C.×10⁷ | 40.0 | 38.5 | 38.3 | | 25.9 | 36.8 | | 41.6 |
| Density, g./cc | 4.07 | 3.90 | 3.99 | 3.75 | 4.80 | 5.24 | 5.51 | 5.76 |
| Def. temp., ° C | 1,150 | 1,125 | 750 | 900 | | | | |

Table XII

|  | 81 | 82 | 83 | 84 | 85 | 86 | 87 | 88 |
|---|---|---|---|---|---|---|---|---|
| $SiO_2$ | 48.2 | 50.9 | 43.8 | 48.2 | 46.1 | 44.2 | 40.8 | 44.1 |
| $Al_2O_3$ | 23.6 | 23.6 | 25.9 | 23.6 | 22.6 | 21.6 | 22.8 | 29.4 |
| $TiO_2$ | 9.1 | 9.1 | 10.7 | 9.1 | 13.0 | 16.7 | 9.1 | 2.0 |
| $MnO$ | 19.1 | 16.4 | 19.6 | 19.1 | 18.3 | 17.5 | 27.3 | |
| $FeO$ | | | | | | | | 24.5 |
| Glass: | | | | | | | | |
| Exp. Coeff./°C.×10⁷ | 32.7 | 30.6 | 33.7 | 32.9 | 35.5 | 41.2 | 40.3 | |
| Density, g./cc | 2.80 | 2.73 | 2.85 | 2.80 | 2.80 | 2.93 | 2.99 | |
| Cryst'n. temp., ° C | 1,100 | 1,100 | 1,100 | 1,100 | 1,100 | 1,100 | 1,100 | 1,200 |
| Hrs. @ cryst'n. temp | 15 | 15 | 16 | 2.5 | 2 | 2 | 2.5 | 4 |
| Properties of Ceramic Products: | | | | | | | | |
| Exp. Coeff./° C.×10⁷ | 101 | 108 | 93.6 | 111 | 128 | 129 | 20.6 | |
| Density, g./cc | 2.88 | 2.82 | 2.94 | 2.93 | 2.88 | 3.04 | 2.86 | |
| Def. Temp., ° C | | | | 1,175 | 1,150 | 1,200 | 1,150 | |
| Strength, p.s.i.×10⁻³ | 16.6 | 15.5 | 24.9 | 10.4 | 16.6 | 21.3 | 10.4 | |

Table XIII

|  | 89 | 90 | 91 | 92 | 93 | 94 | 95 |
|---|---|---|---|---|---|---|---|
| $SiO_2$ | 42.4 | 45.5 | 45.5 | 49.1 | 49.1 | 40.9 | 46.1 |
| $Al_2O_3$ | 28.3 | 22.7 | 18.2 | 18.2 | 21.8 | 25.4 | 19.1 |
| $TiO_2$ | 5.7 | 9.1 | 9.1 | 9.1 | 9.1 | 9.1 | 8.7 |
| FeO | 23.6 | | | | | | |
| CoO | | 22.7 | 27.2 | 23.6 | 20.0 | 24.6 | |
| NiO | | | | | | | 21.7 |
| $B_2O_3$ | | | | | | | 4.4 |
| Glass: | | | | | | | |
| Exp. Coeff./° C.×10⁷ | | 32.9 | | | | 40.5 | |
| Density, g./cc. | | 2.94 | 3.07 | | | 3.11 | |
| Cryst'n. temp., ° C. | 1,200 | 1,100 | 1,100 | 1,200 | 1,200 | 1,250 | 1,200 |
| Hrs. @ cryst'n. temp. | 4 | 16 | 16 | 1 | 1 | 2 | 4 |
| Properties of Ceramic Products: | | | | | | | |
| Exp. Coeff./° C.×10⁷ | | 170 | | | | 174 | |
| Density, g./cc. | | 3.06 | 2.94 | | | 3.18 | |

Table XIV

|  | 96 | 97 | 98 | 99 | 100 | 101 |
|---|---|---|---|---|---|---|
| $GeO_2$ | 61.9 | | | | | |
| $B_2O_3$ | | 33.9 | | | | |
| $P_2O_5$ | | | 62.5 | 62.4 | | |
| $SiO_2$ | | | | | 75 | 65 |
| $Al_2O_3$ | 9.5 | 6.8 | 13.4 | 14.9 | 10 | 17 |
| $TiO_2$ | 4.8 | 8.5 | 10.7 | 9.1 | 15 | 18 |
| ZnO | 23.8 | 50.8 | 13.4 | | | |
| CdO | | | | 13.6 | | |
| Glass: | | | | | | |
| Cryst'n. temp., ° C. | 1,100 | 1,200 | 1,150 | 1,050 | 1,450 | 1,450 |
| Hrs. @ cryst'n. temp. | 2 | 1 | 1 | 1 | 1 | 1 |

By means of a conventional X-ray powder spectrometer or diffractometer, equipped with a Geiger counter and a curve- or trace-drawing device, the various crystalline compounds comprising the ceramic products of the invention can be identified. As is well known, the monochromatized X-ray beam is directed against a powdered specimen to be identified at an angle which is altered progressively and the reflections from the various faces of the crystals of the particular crystalline compounds in the specimen are converted to amplified electrical impulses by the Geiger counter and are reproduced as a series of peaks on the trace. Since each crystalline compound produces peaks which are characteristic of itself, identification of the crystalline compound thereby can be accomplished by anyone skilled in reading and construing such at race, provided that its characteristic peaks are known.

It is also well known that the relative height of the peaks of the trace which characterize a crystalline compound depend upon the intensity of the electrical impulses which produced them and constitute a quantitative measure of the relative amount of the crystalline compound in the specimen. By comparison of the height of the peaks representing a specific crystalline compound in a specimen with the height of similar peaks produced in another trace by a standard of reference containing a known amount of the crystalline compound, the quantity of the crystalline compound in the specimen can be estimated.

By way of contrasting the product made in accordance with this invention with prior crystal-containing products, such as opal glasses and opacified thermometer tube backs, it will be appreciated that the most dense opal glasses resulting from homogeneous nucleation and crystallization have a maximum of about 10 weight percent of crystal content, whereas the ceramic product made in accordance with this invention will have a much higher crystal content, preferably on the order of 50 weight percent, or higher depending upon the extent to which components of the batch are adaptable to the formation of crystalline phases.

The various crystalline compounds which are present in the crystalline ceramics resulting from melting, cooling and heat treating the compositions of the foregoing examples in accordance with the method of the invention, insofar as samples have been subjected to conventional X-ray analysis with identification of crystalline phases, are for example as follows, the various crystals of each composition being named in the order of their abundance and the first named crystal being the predominant phase:

Table XV

| No. | Crystalline Phases |
|---|---|
| 2 | Spodumene, rutile. |
| 3 | Do. |
| 10 | Cordierite, magnesium titanate. |
| 11 | Do. |
| 12 | Cordierite, rutile. |
| 13 | Do. |
| 14 | Do. |
| 15 | Cordierite, magnesium titanate, rutile, cristobalite. |
| 16 | Cordierite, rutile, cristobalite. |
| 17 | Cordierite, magnesium titanate. |
| 18 | Cordierite, cristobalite, magnesium titanate. |
| 19 | Cordierite, quartz, rutile, magnesium titanate. |
| 20 | Cordierite, rutile, cristobalite, magnesium titanate. |
| 22 | Cordierite, magnesium aluminum titanate. |
| 23 | Cordierite, rutile, wallastonite. |
| 24 | Cordierite, rutile. |
| 25 | Cordierite, rutile, wallastonite. |
| 27 | Cordierite, rutile, cristobalite. |
| 28 | Anorthite, rutile. |
| 29 | Anorthite, rutile, cristobalite. |
| 30 | Anorthite, sphene, cristobalite. |
| 31 | Sphene, cristobalite, anorthite. |
| 32 | Cristobalite, anorthite, sphene, tridymite. |
| 33 | Cristobalite, anorthite, anatase. |
| 34 | Cristobalite, anorthite, rutile. |
| 35 | Anorthite, cristobalite. |
| 37 | Gahnite, willemite, cristobalite, rutile. |
| 38 | Gahnite, cristobalite, rutile. |
| 39 | Gahnite, willemite, rutile. |
| 41 | Gahnite, cristobalite, willemite, rutile. |
| 42 | Gahnite, cristobalite, rutile. |
| 43 | Gahnite, cristobalite, willemite, rutile. |
| 44 | Do. |
| 45 | Do. |
| 46 | Willemite, gahnite, cristobalite, rutile. |
| 47 | Gahnite, rutile. |
| 48 | Gahnite, cristobalite, willemite, rutile. |
| 58 | Dibarium trisilicate. |
| 60 | Do. |
| 61 | Do. |
| 62 | Do. |
| 63 | Do. |
| 64 | Do. |
| 65 | Do. |
| 67 | Do. |
| 78 | Lead titanate. |
| 79 | Do. |
| 80 | Do. |
| 81 | Cristobalite, pyrophanite, quartz, mullite. |
| 82 | Cristobalite, manganese cordierite, pyrophanite, quartz. |
| 83 | Pyrophanite, tridymite, mullite, quartz. |
| 84 | Cristobalite, garnet, pyrophanite, quartz, mullite. |
| 85 | Pyrophanite, cristobalite, quartz, manganese cordierite. |
| 86 | Pyrophanite, cristobalite, quartz, mullite. |
| 87 | Manganese cordierite, pyrophanite, quartz. |

Articles produced by the new method and comprising the foregoing or other crystalline products have electrical and/or other physical properties such as mechanical or flexural strength, thermal expansion coefficient and deformation temperatures which usually differ substantially and desirably from those of the corresponding parent glass. For example, compositions 1 to 8 contain substantial amounts of Li₂O and the crystalline products resulting therefrom, I now believe, contain beta-spodumene (Li₂O·Al₂O₃·4SiO₂) which has a thermal expansion coefficient of practically zero. By using such glasses, therefore, it is possible to produce ceramics having very low thermal expansion coefficients.

Glasses containing BeO, such as composition 9, I now believe, yield products containing beryl

(3BeO·Al₂O₃·6SiO₂)

which also has a low thermal expansion coefficient. Such products have low expansion coefficients, high deformation temperatures and high mechanical strength and hardness. The glasses are dangerous to make, however, on account of the extremely toxic character of BeO.

Compositions 10 to 27 contain substantial amounts of MgO and their crystalline products, I now believe, contain alpha-cordierite (2MgO·2Al₂O₃·5SiO₂) which also has a low thermal expansion coefficient. In addition to low thermal expansivity, high mechanical strength, hardness, deformation temperatures, and thermal shock resistance, such products, I now believe, possess low dielectric constants, being about 5 for the crystalline product of Example 15.

Compositions 25–26 and 28–36 contain substantial amounts of CaO and their crystalline products, I now believe, contain anorthite (CaO·Al₂O₃·2SiO₂) which has an intermediate thermal expansion coefficient. The mechanical strength, hardness, and deformation temperature of such products are substantially higher than those of the parent glass.

Compositions 36 to 48 contain substantial amounts of ZnO and their crystalline products, I now believe, contain primarily zinc spinel or gahnite (ZnO·Al₂O₃) and also, in some compositions, willemite (2ZnO·SiO₂). These products have high deformation temperatures and high hardness and abrasion resistances.

The crystalline products obtained from glasses containing mixtures of 2 or more of the above recited basic metal oxides, such as the glasses of compositions 5–8, 17, 22, 23, 25–27, 36–40, 55–56, and 67–68, generally have properties intermediate of those of the crystalline products resulting from glasses individually containing the same basic metal oxides. Moreover, the maximum amount of basic metal oxide, which will produce a composition capable of being melted and cooled as a glass, may in some instances be substantially increased by combining 2 or more of the basic metal oxides in a single composition. Similarly the range of compositions capable of being melted and cooled to form glasses can be broadened by the judicious addition of other compatible metal oxides, particularly the fluxes Na₂O, K₂O, and B₂O₃, in limited amounts as is pointed out above.

As compared with prior ceramics made by firing powdered non-vitreous mixtures which have been compacted and shaped in various ways, the ceramics made by the above described method possess many advantages; they can be made free of voids and with zero porosity; they possess a very fine-grained and uniform crystalline structure; they can be produced with extremely thin walls; they usually possess greater mechanical strength than the prior ceramics; they are free from shrinkage and change of shape normally due to prior methods of drying and firing; and the diversity of possible chemical composition is very large.

While this invention has been described and illustrated with particular emphasis on its applicability to silicate glasses, it is to be understood that both the principles and the practice of the invention are likewise applicable to systems which employ another, or others, of the "network formers" as that term is used in the glass-making art. Thus, by way of illustration, reference is made to compositions 96, 97, and 98 which represent specific embodiments of the application of the invention to systems in which germanium oxide, boric oxide, and phosphoric oxide, respectively, constitute the network former.

Compositions consisting of SiO₂, Al₂O₃, and TiO₂ and lacking any of the aforementioned basic metal oxides are also within the scope of the present invention and are illustrated by Examples 100 and 101. Such glasses are relatively hard glasses and a melting temperature of 1650° C. or more is required to melt them. After being converted to crystalline ceramics by the hereinbefore described method their deformation temperatures are generally higher than those of compositions containing one or more of the aforementioned basic metal oxides.

The mass of compositions given above is obviously intended to be illustrative only, rather than as, in any way, defining the limits of the invention; since it is well within the purview of one skilled in the glass-making art, and having the benefit of the foregoing description and teaching, to apply the invention to a very large number of additional compositions which can be compounded as glasses using the wide variety of possible combinations of the network formers and network modifiers as set forth hereinabove.

I claim:

1. The method of making a ceramic product which comprises melting a glass-making composition containing from 2–20% by weight of TiO₂ and at least 50% by weight, exclusive of said TiO₂, of crystallizable glass-making ingredients, cooling the melt to form a glass, exposing the glass to a temperature between the maximum nucleation temperature and the annealing temperature of the glass for a time of between 1 minute and 100 hours, and finally increasing the temperature of the glass to a level at which said glass-making ingredients crystallize but below the temperature at which the predominant crystalline phase will redissolve, and maintaining said glass within said temperature range until a product, at least 50% of which is crystalline, is obtained.

2. The method of claim 1 wherein said crystallizable glass-making ingredients include SiO₂ and Al₂O₃.

3. The method of claim 1 wherein said glass-making composition contains in addition to the TiO₂, Al₂O₃, at least one glass-network former selected from the group consisting of SiO₂, P₂O₅, B₂O₃, and GeO₂, and at least one metal oxide selected from the group consisting of Li₂O, BeO, MgO, CaO, ZnO, SrO, CdO, BaO, PbO, MnO, FeO, CoO, and NiO, and wherein the combined weight of the glass-network former, Al₂O₃, said metal oxide, and said TiO₂, constitutes at least 90% by weight of the glass-making composition and said TiO₂ constitutes 2–20% of said combined weight.

4. The method of claim 3 in which the TiO₂ is 8 to 15 weight percent.

5. The method of claim 3 in which the glass-network former is SiO₂.

6. The method of claim 3 in which the glass, after being melted, is cooled and pulverized and the powdered glass is intimately mixed with at least one finely divided ceramic material of greater refractoriness than the glass and the mixture is molded to shape and heated to fuse the glass and the molded article is thereafter cooled and reheated as defined.

7. The method of claim 6 in which the molded article is cooled to a temperature about 50° C. above the annealing point of the glass where it is held for at least 0.5 hour before it is reheated.

8. The method of claim 7 in which the molded article is reheated at a rate not exceeding 5° C. per minute up to 25°–50° C. below the temperature at which the predominant crystalline phase will redissolve where it is held for at least one hour.

9. The method of claim 3 in which a shaped article is formed of the melted glass before it is cooled.

10. The method of claim 9 in which the glass article is cooled to a temperature about 50° C. above the annealing point of the glass where it is held for at least 0.5 hour before it is reheated.

11. The method of claim 10 in which the article is reheated at a rate not exceeding 5° C. per minute up to 25–50° C. below the temperature at which the predominant crystalline phase will redissolve where it is held for at least one hour.

12. A ceramic body consisting essentially of a multiplicity of interlocked inorganic crystals dispersed in a glassy matrix, said crystals being on the order of 0.1–20 microns in diameter and constituting at least 50% of the body and formed by crystallization in situ from a glass consisting essentially of inorganic constituents, said glassy matrix consisting essentially of the uncrystallized portion of the glass.

13. A ceramic material consisting essentially of a multiplicity of interlocked inorganic crystals dispersed in a glassy matrix, said crystals being on the order of 0.1–20 microns in diameter and constituting at least 50% of the material and formed by crystallization in situ from a glass consisting essentially of inorganic constituents including 2–20% by weight of $TiO_2$, said glassy matrix consisting essentially of the uncrystallized portion of the glass after crystallization of said crystals.

14. A ceramic body consisting essentially of a multiplicity of interlocked inorganic crystals dispersed in a glassy matrix, said crystals being on the order of 0.1–20 microns in diameter and constituting at least 50% of the body and formed by crystallization in situ from a glass consisting essentially of inorganic constituents including 2–20% by weight of $TiO_2$, said glassy matrix consisting essentially of the uncrystallized portion of the glass remaining after crystallization of said crystals.

15. The ceramic body of claim 14 wherein said inorganic constitutents include compounds of Si and compounds of Al.

16. The ceramic body of claim 14 wherein said inorganic constitutents include compounds of P and compounds of Al.

17. The ceramic body of claim 14 wherein said inorganic constitutents include compounds of B and compounds of Al.

18. The ceramic body of claim 14 wherein said inorganic constituents include compounds of Ge and compounds of Al.

19. The ceramic body of claim 14 comprising $SiO_2$, $Al_2O_3$, and $TiO_2$ in a total amount of at least 90 weight percent.

20. The ceramic body of claim 14 which comprises a glass-network former selected from the group consisting of $SiO_2$, $P_2O_5$, $B_2O_3$, and $GeO_2$ together with $Al_2O_3$, $TiO_2$, and at least one basic metal oxide, the total amount of glass-network former, $Al_2O_3$, $TiO_2$, and basic metal oxide being at least 90 weight percent.

21. A ceramic body consisting essentially of a multiplicity of interlocked inorganic crystals dispersed in a glassy matrix, said crystals being on the order of 0.1–20 microns in diameter and constituting at least 50% of said body and formed by crystallization in situ from a glass consisting essentially of inorganic compounds, 90% of said inorganic compounds consisting of $SiO_2$, $Al_2O_3$, 2–20% of $TiO_2$, and at least one basic metal oxide.

References Cited in the file of this patent

UNITED STATES PATENTS

| | | |
|---|---|---|
| 1,394,296 | Fisher | Oct. 18, 1921 |
| 1,728,350 | Littleton | Sept. 17, 1929 |
| 1,814,012 | Taft | July 14, 1931 |
| 1,893,382 | Watson | Jan. 3, 1933 |
| 2,048,263 | Haglund | July 21, 1936 |
| 2,132,390 | Blau | Oct. 11, 1938 |
| 2,252,981 | Ridgway | Aug. 19, 1941 |
| 2,339,975 | Blau | Jan. 25, 1944 |
| 2,488,507 | Burdick et al. | Nov. 15, 1949 |
| 2,683,666 | Duncan et al. | July 13, 1954 |
| 2,691,855 | Armistead | Oct. 19, 1954 |

FOREIGN PATENTS

| | | |
|---|---|---|
| 256,188 | Great Britain | June 10, 1926 |
| 446,970 | Great Britain | May 6, 1936 |
| 686,246 | Great Britain | Jan. 21, 1953 |